(12) United States Patent
Carbone

(10) Patent No.: US 6,343,728 B1
(45) Date of Patent: Feb. 5, 2002

(54) FISHING ROD AND REEL CARRY BAG

(76) Inventor: George V. Carbone, 35 Tremont St., Peabody, MA (US) 01960

( * ) Notice: Subject to any disclaimer, the term of this patent is extended or adjusted under 35 U.S.C. 154(b) by 0 days.

(21) Appl. No.: 09/621,880

(22) Filed: Jul. 22, 2000

(51) Int. Cl.$^7$ ................................................. A45F 3/02
(52) U.S. Cl. ........................ 224/607; 224/610; 224/680; 224/922; 43/26; 206/315.1; D3/260
(58) Field of Search ............................ 224/607, 610, 224/614, 922, 677, 680, 681, 682; 206/315.1; 43/26; D3/260

(56) References Cited

U.S. PATENT DOCUMENTS

| | | | | |
|---|---|---|---|---|
| 2,723,482 A | * | 11/1955 | Marten | 43/26 |
| 3,033,259 A | * | 5/1962 | Landis, Sr. | 43/26 X |
| 4,546,877 A | * | 10/1985 | Evans | 206/315.1 |
| 4,715,416 A | * | 12/1987 | Horne | 190/104 X |
| D332,526 S | * | 1/1993 | Bowman | D3/260 X |
| 5,277,306 A | * | 1/1994 | Sargent | 206/315.1 |
| 5,417,354 A | * | 5/1995 | Jones | 224/202 |
| 5,488,799 A | * | 2/1996 | Hauschild | 43/26 |
| D395,360 S | * | 6/1998 | Schrader, Jr. | D3/260 |
| D442,367 S | * | 5/2001 | Terrell | D3/260 |

* cited by examiner

Primary Examiner—Stephen K. Cronin
(74) Attorney, Agent, or Firm—Don Halgren

(57) ABSTRACT

The present invention includes a support bag for the enclosure and controlled support of a fishing rod and reel arrangement. The elongated flexible enclosure bag has a first end and a second end, each of the ends being open for receipt of a fishing rod therethrough. The enclosure bag being defined by a first and a second multilayer sidewall. A reel-enclosing pouch compartment is located adjacent the first end of the elongated bag, arranged to protectively enclose the reel. A first pocket is arranged on a forward portion of the first sidewall and a second pocket is arranged on a forward portion of the second sidewall for receipt of supplemental fishing gear and to provide a forward balance to the bag when a reel is enclosed adjacent the first end of the elongated bag.

14 Claims, 3 Drawing Sheets

FISHING ROD AND REEL CARRY BAG

BACKGROUND OF THE INVENTION

1. Field of the Invention

This invention relates to an elongated support bag for the carrying of a fishing rod and reel with related equipment.

2. Prior Art

The sport of fishing typically entails a lot of equipment and accessory items. The sport of fishing also requires that the equipment and accessory items typically be carried from a vehicle to another site where the fishing will take place. Keeping that equipment organized, clean and under control is often difficult to do.

Surf casting, a type of sport fishing, requires additional equipment by which the fishing tackle is maintained supported in an upright orientation on land after the fishing line has been cast. That additional equipment often gets sandy and salty. It is desirable to keep the fishing rod and reel separated as much as possible from that supplemental equipment during their transport, because that supplemental equipment is less delicate and which would not be hurt by such salt and sand.

There is need for an arrangement to keep separated and protected the fishing rod and reel, while also permitting cumbersome accessory equipment, such as a sand spike to be carried therewith. There is also a need to carry that fishing rod and reel and related equipment in an efficient and unobtrusive manner as possible because such equipment is awkward anyway in view of its length and dissymmetry thereof.

It is therefore an object of the present invention, to provide a fishing rod and reel carrying bag which improves the prior art.

It is a further object of the present invention to provide a carrying arrangement which segregates components of the rod and reel and accessories and maximizes their unobtrusiveness.

It is yet still a further object of the present invention, to provide a carrying and support arrangement which will protect the rod and reel and related equipment, from the environment, as well as from sinking it fell into water.

It is still yet a further object of the present invention, to provide a support arrangement for a rod and reel and related accessories, which support arrangement will also function to provide personal comfort for the fisherman as well as safety for his equipment.

BRIEF SUMMARY OF THE INVENTION

The present invention relates to an elongated fishing rod and reel enclosure and carry bag for enclosing and carrying at least a major portion of a fishing rod and reel and related accessories and equipment. The elongated bag is made from a flexible material such as nylon or Gortex™ or the like, having an overall length for example, of approximately 38 inches, or long enough to have the handle at the proximal end and the distal end of the first section of rod extend out of their respective ends of the elongated bag. The elongated bag is thus opened at each end for throughput of a rod and reel arrangement. The bag is asymmetrical along its longitudinal axis, and has a bulbous pouch extending a lower side thereof. The midpoint of the pouch is arranged at a location about one third the distance of the bag from a first end thereof. The pouch then extends downwardly from an uppermost edge of the elongated support bag by for example, to about 12 inches.

The elongated bag has an elasticized sleeve at each end thereof, and an elongated zipper extends from one end of the uppermost edge of the elongated bag to the second or distalmost end of the elongated bag. The elasticized sleeve at the distalmost end of the elongated bag is preferably unitary, so that the zipper does not permit that elasticized band to be split open.

The elongated bag has a support handle arranged across its uppermost edge on a second sidewall thereof, and at a midpoint thereof for carrying the bag by a single hand. The elongated bag also has an elongated shoulder strap extending from an upper edge thereof at the first end to an upper edge thereof at the second end.

The pouch and the elongated support bag are defined by a first sidewall and the second sidewall with an elongated strip of material comprising a curvilinear lowermost wall. The elongated support bag is about three to four inches in width along its entire length, sufficient to enclose a reel of up to approximately 8 inches in diameter and several inches thick, within that pouch. An elongated generally quadrilateral-shaped first pocket is arranged on the first sidewall of the elongated bag forward of the pouch, with a Velcro™ type fastener across its uppermost edge. The first sidewall has a pair of spaced apart Velcro™ securable straps on its outer surface approximately two and one half feet apart for supportive enclosure of a sand spike. The sand spike is utilizable for supporting the lower end of the surfcasting rod within a beach or waterfront location. The sandspike is a tubular member having a lowermost pointed first end and a flat uppermost end which receives the rod therewithin. The second sidewall of the elongated support bag at approximately the midpoint thereof, has a second pocket attached thereto to give it balance with the first pocket and additional carrying capacity, is closable with an uppermost Velcro™ sealable edge arranged in an overlapping fashion with the pocket.

The second sidewall has an inner surface onto which a pair of spaced apart Velcro™ straps are secured, which are openable and closable about a disassembled fishing rod placed therewithin.

An elongated sheath of nylon or Gortex™ material may be disposed over the distalmost end of the fishing rod extending from the second or distalmost end of the elongated support bag. The elongated sleeve would have an elasticized opening which would mate about the distalmost end of the elongated support bag for securement thereto. The elongated sheath would provide enclosure and safety for the distalmost tip of the fishing rod in storage or transport.

In a further embodiment of the present invention, the sidewalls and lowermost wall of the elongated support bag is multi-layered, so as to permit enclosure of a soft padding to act as a cushion or barrier against damage of the contents of the elongated support bag.

In yet a further embodiment of the present invention, at least a portion of the sidewalls of the elongated support bag are water impervious and may have floatation material therebetween, so as to act as a floatation device for the contents of the elongated support bag, (or fisherman) should that be necessary.

Thus, what has been shown is a unique and safe enclosure and carrying support for a fishing rod and reel and its associated equipment and accessories. The elongated bag separates the more delicate components of the equipment from the less delicate accessories and permits the safe support and carrying of those devices to the fishing site in an appropriate manner. The elongated enclosure and support bag also functions as a safety device to minimize the likelihood of loss and possibly provide comfort to the fishermen using that elongated support bag.

The invention thus comprises a support bag for the enclosure and controlled support of a fishing rod and reel arrangement, comprising: an elongated flexible enclosure bag having a first end and a second end, each of the ends being open for receipt of the fishing rod therethrough, the enclosure bag being defined by a first and a second multi-layer sidewall; a reel-enclosing pouch compartment located adjacent the first end of the elongated bag, arranged to protectively enclose the reel; and a first pocket on a forward portion of the first sidewall and a second pocket on a forward portion of the second sidewall for receipt of supplemental fishing gear and to provide a forward balance to the bag when a reel is enclosed adjacent the first end of said elongated bag. An elasticized sleeve is arranged at each end thereof for snug receipt about a fishing rod extending through the elongated bag. A zipper is arranged through the first sleeve at the first end of the bag up to the second sleeve at the second end of the bag, to ensure enclosure of the bag about the distal end of the rod. A removable sheath is arranged for protective enclosure of distal end of the rod during transport and storage thereof. One of the sidewalls has an inner side with a plurality of straps thereon for wrapping around a fishing rod enclosed within the enclosure bag. A handle may be arranged on an upper edge of the elongated bag at a midpoint thereof to permit balanced one-handed carrying thereof. An elongated shoulder strap may be attached at said upper edge of the elongated bag to permit carrying of the bag by one's shoulder. The multilayer sidewalls may have a padding material therebetween for safety of the rod and reel carried therein. At least one of the multilayer sidewalls may be comprised of a floatation material. At least one of the sidewalls may have an outer surface with a pair of spaced apart straps thereon to controllably support an elongated sand spike segregated from said rod and reel. The support bag is at least about 38 inches long for the safe support of a fishing rod therewithin. The elongated may be about at least 3 inches wide for the safe support of a fishing rod and reel therewithin. The pouch has a mid-portion which is spaced about one third the length of bag from its first end thereof.

BRIEF DESCRIPTION OF THE DRAWINGS

The objects and advantages of the present invention will become more apparent, when viewed in conjunction with the following drawings in which.

DESCRIPTION OF THE PREFERRED EMBODIMENTS

Figure 1:
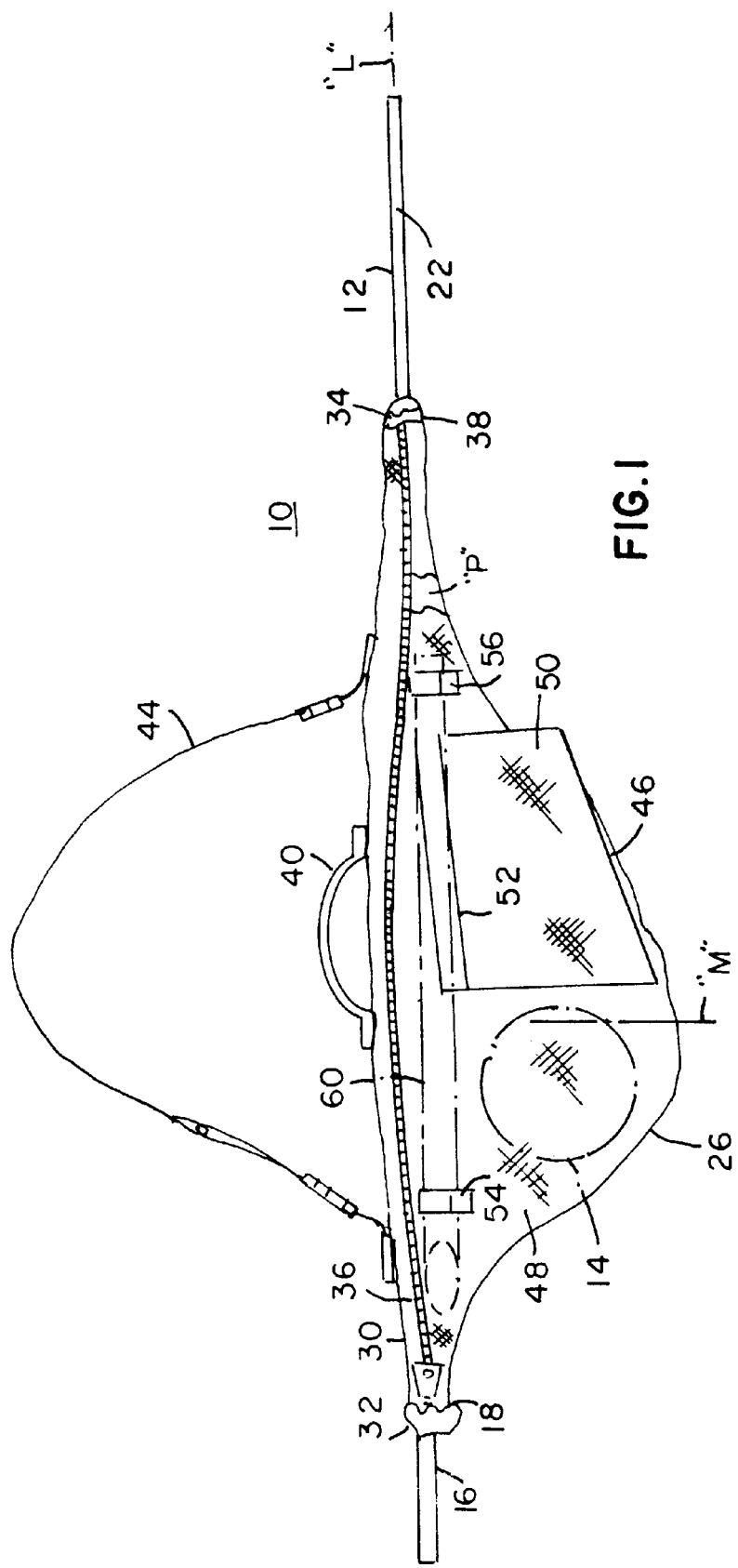
FIG. 1 is a side elevational view of a first side of the elongated support bag constructed according to the principles of the present invention.

Referring now to the drawings in detail, and particularly to FIG. 1, there is shown the present invention which comprises an elongated fishing rod and reel enclosure and carry bag 10 for enclosing and carrying at least a major portion of a fishing rod 12 and reel 14 and related accessories and equipment. The elongated bag 10 is made from a flexible material such as nylon or Gortex™ or the like, having an overall length for example, of approximately 38 inches, or long enough to have the handle 16 of the first section of rod 12 extend out from the proximal end 18 of the elongated bag 10 and the distal tip 20 of the first section of the rod 12 extend out of the distal end 22 of the elongated bag 10. The elongated bag 10 is thus opened at each end for throughput of a rod 12 and reel 14 arrangement. The elongated bag 10 is asymmetrical along the length of its longitudinal axis "L", and has a bulbous pouch 26 extending at a lower side thereof, as shown in both FIGS. 1 and 2. The midpoint "M" of the pouch 26 is arranged at a location about one third the distance of the bag from the proximal or first end 18 thereof. The pouch 26 then extends downwardly from an uppermost edge 30 of the elongated support bag 10 by for example, to about 12 inches.

The elongated bag 10 has an elasticized sleeve 32 and 34 at each end thereof. The sleeve 32 at the proximal end 18 is preferably openable. An elongated zipper 36 extends from the proximal end 18 (preferably through the elasticized sleeve 32) of the uppermost edge 30 of the elongated bag to the second or distalmost end 38 of the elongated bag 10. The elasticized sleeve 34 at the distalmost end 38 of the elongated bag 10 is preferably unitary, so that the zipper 36 does not permit that elasticized band 34 to be split open.

Figure 2:
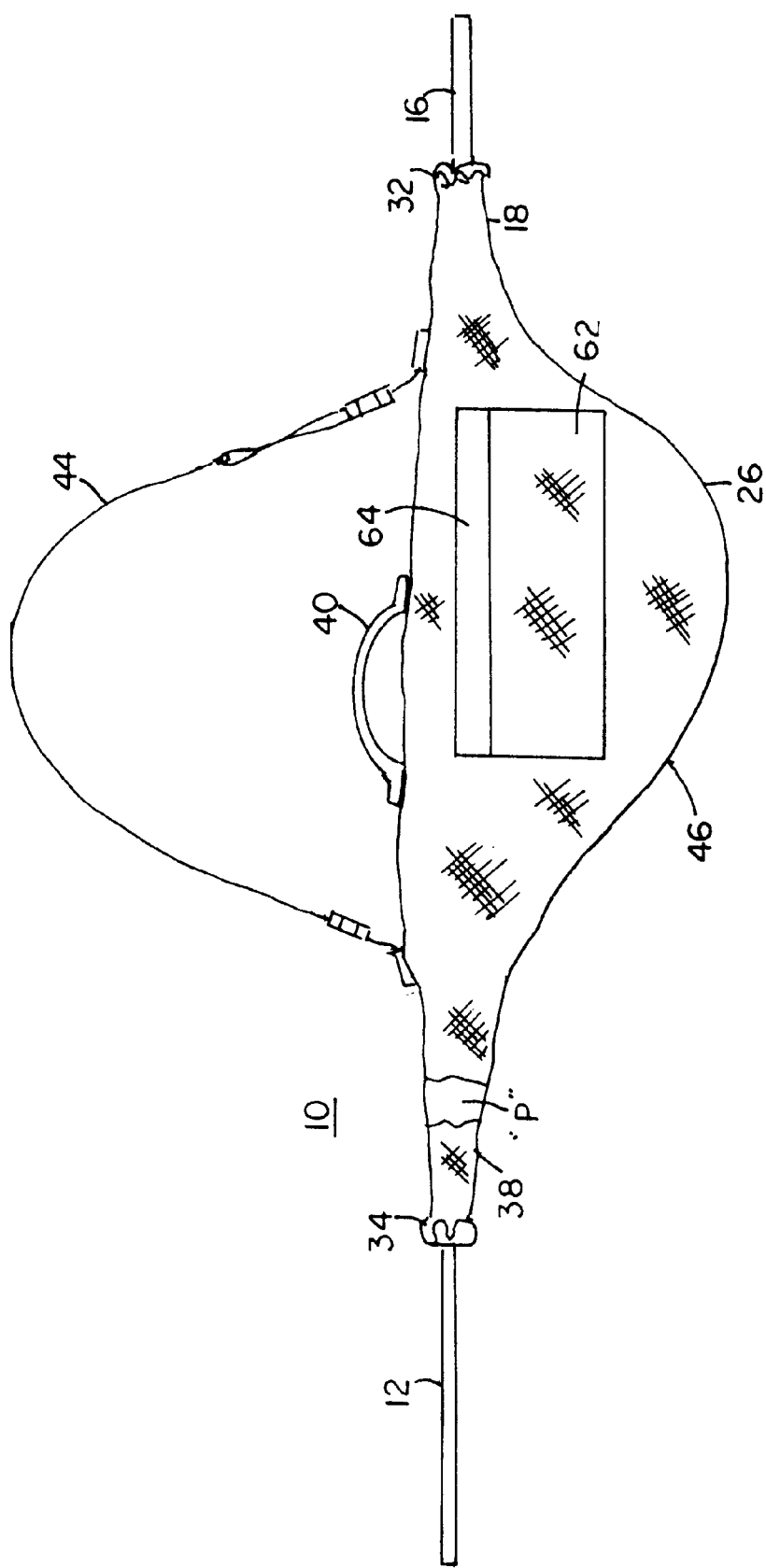
FIG. 2 is a side elevational view of the second side of the elongated support bag shown in FIG. 1.
Figure 3:
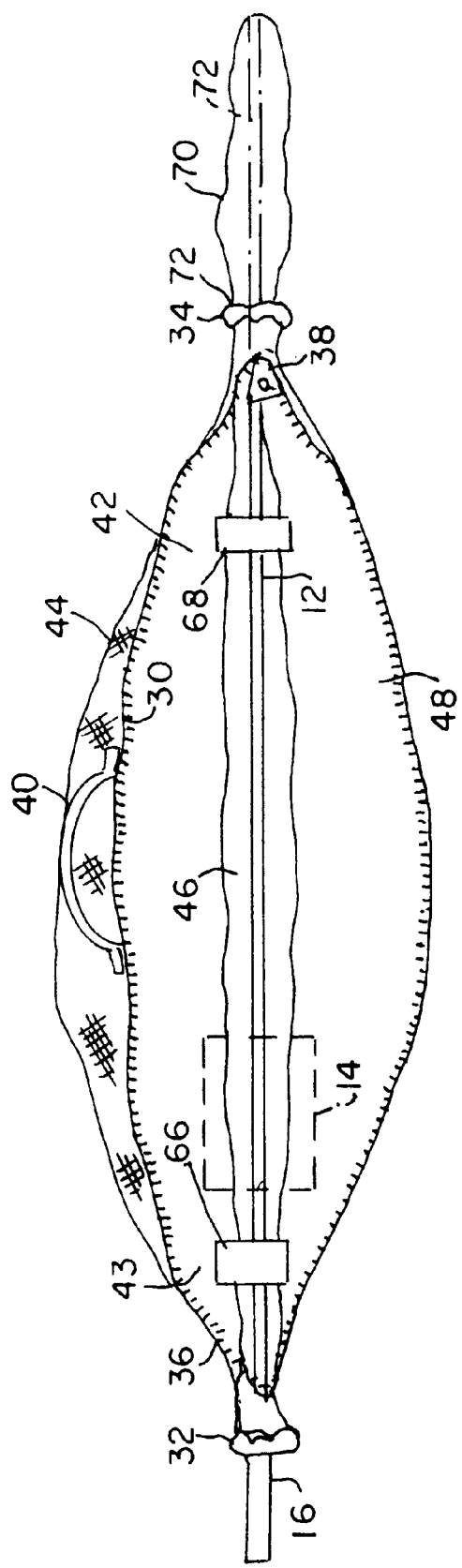
FIG. 3 is a plan view of the bag shown in FIG. 1, in its open configuration, showing the details of construction thereinside.

The elongated bag 10 has a support handle 40 arranged across its uppermost edge 30, as shown in FIGS. 1, 2 and 3, on a second sidewall 42 thereof, and at a midpoint thereof for carrying the bag 10 by a single hand. The elongated bag 10 also has an elongated shoulder strap 44 extending from the upper edge 30 thereof near the first end 18 to the upper edge 30 thereof at the second or distalmost end 38.

The pouch 26 of the elongated support bag 10 is defined by a first sidewall 48 and the second sidewall 42 with an elongated strip of material comprising a curvilinear lowermost wall 46. The elongated support bag 10 is about three to four inches in width along its entire length, sufficient to enclose a reel 14 of up to approximately 8 inches in diameter and several inches thick, within that pouch 26. An elongated generally quadrilateral-shaped first pocket 50 is arranged on the first sidewall 48 of the elongated bag 10 arranged for expansion purposes on the forward side of the pouch 26, as shown in FIG. 1, having a Velcro™ type fastener 52 across its uppermost edge. The first sidewall 48 has a pair of spaced apart Velcro™ securable straps 54 and 56 on its outer surface approximately two and one half feet apart to permit supportive control and outside segregation of a typically cumbersome sand spike 60. The sand spike 60 is utilizable for supporting the lower end of the surfcasting rod within a beach or waterfront location. The sandspike 60 is a tubular member having a lowermost pointed first end and a flat uppermost end which receives the rod therewithin. The second sidewall 42 of the elongated support bag 10 at approximately the midpoint thereof, has a second pocket 62 attached thereto, as shown in FIG. 3 to give the bag 10 balance with the first pocket 50 and additional carrying capacity, and is closable with an uppermost Velcro™ sealable edge 64 arranged in an overlapping fashion with the pocket 62.

The second sidewall 42 has an inner surface 43 onto which a pair of spaced apart Velcro™ straps 66 and 68 are secured, which are openable and closable about a disassembled fishing rod 12 placed therewithin.

An elongated sheath 70 of nylon or Gortex™ material may be disposed over the distalmost end 22 of the fishing rod 12 extending from the second or distalmost end 38 of the elongated support bag 10. The elongated sleeve 70 would have an elasticized opening 72 which would mate about the distalmost end of the elongated support bag for securement thereto, as shown in FIG. 3. The elongated sheath 70 would provide enclosure and safety for the distalmost tip 22 of the fishing rod 12 in storage or transport.

In a further embodiment of the present invention, the sidewalls 42 and 44 and lowermost wall of the elongated support bag may multi-layered, so as to permit enclosure of a soft padding between the layers of each sidewall 42 and 44, to act as a cushion or barrier against damage of the contents of the elongated support bag.

In yet a further embodiment of the present invention, at least a portion "P" of the sidewalls 42 and 44 of the elongated support bag 10 are water impervious and may have floatation material therebetween, so as to act as a floatation device for the contents of the elongated support bag, (or fisherman) should that be necessary.

Thus, what has been shown is a unique and safe enclosure and carrying support for a fishing rod and reel and its associated equipment and accessories. The elongated bag separates the more delicate components of the equipment from the less delicate accessories and permits the safe support and carrying of those devices to the fishing site in an appropriate manner. The elongated enclosure and support bag also functions as a safety device to minimize the likelihood of loss and possibly provide comfort to the fishermen using that elongated support bag.

I claim:

1. An support bag for the enclosure and controlled support of a fishing rod and reel arrangement, comprising:
    an elongated flexible enclosure bag having a first end and a second end, each of said ends being open for receipt of said fishing rod therethrough, said enclosure bag being defined by a first and a second multilayer sidewall;
    a reel-enclosing pouch compartment located adjacent said first end of said elongated bag, arranged to protectively enclose said reel; and
    a first pocket on a forward portion of said first sidewall and a second pocket on a forward portion of said second sidewall for receipt of supplemental fishing gear and to provide a forward balance to said bag when a reel is enclosed adjacent said first end of said elongated bag.

2. The support bag as recited in claim 1, including an elasticized sleeve at each end thereof for snug receipt about a fishing rod extending through said elongated bag.

3. The support bag as recited in claim 1, including a zipper arranged through said first sleeve at said first end of said bag up to said second sleeve at said second end of said bag, to ensure enclosure of said bag about the distal end of said rod.

4. The support bag as recited in claim 3, including a removable sheath for protective enclosure of distal end of said rod during transport and storage thereof.

5. The support bag as recited in claim 1, wherein one of said sidewalls has an inner side with a plurality of straps thereon for wrapping around a fishing rod enclosed within said enclosure bag.

6. The support bag as recited in claim 5, including a handle arranged on an upper edge of said elongated bag at a mid-point thereof to permit one-handed carrying thereof.

7. The support bag as recited in claim 6, also including an elongated shoulder strap attached at said upper edge of said elongated bag to permit carrying of said bag by one's shoulder.

8. The support bag as recited in claim 1, wherein said multilayer sidewalls have a padding material therebetween for safety of said rod and reel carried therein.

9. The support bag as recited in claim 1, wherein at least one of said multilayer sidewalls is comprised of a floatation material.

10. The support bag as recited in claim 1, wherein at least one of said sidewalls has an outer surface with a pair of spaced apart straps thereon to controllably support an elongated sand spike segregated from said rod and reel.

11. The support bag as recited in claim 1, wherein said elongated bag is at least about 38 inches long for the safe support of a fishing rod therewithin.

12. The support bag as recited in claim 11, wherein said elongated is at least 3 inches wide for the safe support of a fishing rod and reel therewithin.

13. The support bag as recited in claim 11, wherein said pouch has a mid-portion which is spaced about one third the length of bag from said first end thereof.

14. A support bag for the enclosure and controlled support of a fishing rod and reel arrangement, comprising:
    an elongated flexible enclosure bag having a first end and a second end, each of said ends being open for receipt of said fishing rod therethrough, said enclosure bag being defined by a first and a second multilayer sidewall;
    a reel-enclosing pouch compartment located adjacent said first end of said elongated bag, arranged to protectively enclose said reel;
    a first pocket on a forward portion of said first sidewall and a second pocket on a forward portion of said second sidewall for receipt of supplemental fishing gear and to provide a forward balance to said bag when a reel is enclosed adjacent said first end of said elongated bag;
    an elasticized sleeve at each end thereof for snug receipt about a fishing rod extending through said elongated bag;
    a zipper arranged through said first sleeve at said first end of said bag up to said second sleeve at said second end of said bag, to ensure enclosure of said bag about the distal end of said rod;
    a removable sheath for protective enclosure of distal end of said rod during transport and storage thereof; and one of said sidewalls has an inner side with a plurality of straps thereon for wrapping around a fishing rod enclosed within said enclosure bag;
    a handle arranged on an upper edge of said elongated bag at a mid-point thereof to permit one-handed carrying thereof;
    an elongated shoulder strap attached at said upper edge of said elongated bag to permit carrying of said bag by one's shoulder;
    said multilayer sidewalls have a padding material therebetween for safety of said rod and reel carried therein; and at least one of said multilayer sidewalls is comprised of a floatation material, and at least one of said sidewalls has an outer surface with a pair of spaced apart straps thereon to controllably support an elongated sand spike segregated from said rod and reel.

* * * * *